United States Patent

Wahli et al.

[15] 3,663,801

[45] May 16, 1972

[54] METHOD AND APPARATUS FOR EVALUATING COLOR-CODED INFORMATION

[72] Inventors: Robert Wahli, Unterengstringen, Switzerland; Ciba Limited, Basel, Switzerland

[22] Filed: July 7, 1969

[21] Appl. No.: 839,455

[30] Foreign Application Priority Data

July 16, 1968 Switzerland ........................10605/68

[52] U.S. Cl. ................235/61.11 E, 340/146.3 B, 250/219 D

[51] Int. Cl. ..........................................................G06k 7/12

[58] Field of Search ..........................235/61.1 E, 92 V, 61.7; 340/146.3 K, 146.3 B, 173 CC, 173 LT; 250/219 D, 219 Q, 226; 178/7.86

[56] References Cited

UNITED STATES PATENTS

| | | | |
|---|---|---|---|
| 2,899,132 | 8/1959 | Orthuber | 235/61.11 E |
| 3,145,291 | 8/1964 | Brainerd | 340/146.3 K |
| 3,315,229 | 4/1967 | Smithline | 235/92 V |
| 3,417,231 | 12/1968 | Stites et al. | 235/61.11 E |
| 3,513,320 | 5/1970 | Weldon | 250/226 |
| 3,474,230 | 10/1969 | McMillen | 235/61.7 |

*Primary Examiner*—Maynard R. Wilbur
*Assistant Examiner*—Leo H. Boudreau
*Attorney*—Pierce, Scheffler & Parker

[57] ABSTRACT

Method and apparatus for converting color-coded information into binary coded information and checking the latter against itself and/or a reference code, the original information being coded in the primary colors red, green and blue and the complementary colors cyan, magenta and yellow. By the conversion there is produced a first supplemental signal each time a primary color is detected and a second supplemental signal each time a complementary color is detected. The first and second supplemental signals are utilized to check the binary coded information converted from the color-coded original information.

7 Claims, 13 Drawing Figures

Patented May 16, 1972

3,663,801

10 Sheets-Sheet 1

Inventor

Robert Wahli

By Pierce, Scheffler & Parker

Attorneys

| | | FILTER | | |
|---|---|---|---|---|
| | | R | G | B |
| CODE-COLOR | R | L | O | O |
| | G | O | L | O |
| | B | O | O | L |
| | C | O | L | L |
| | M | L | O | L |
| | Y | L | L | O |

FIG. 2

| | | LOGIC SIGNALS | | |
|---|---|---|---|---|
| | | $\rho$ | $\gamma$ | $\beta$ |
| COLOR SIGNAL | R | L | O | O |
| | G | O | L | O |
| | B | O | O | L |
| | C | O | L | L |
| | M | L | O | L |
| | Y | L | L | O |

FIG. 3

Inventor
Robert Wahli

By Pierce, Scheffler & Parker
Attorneys

FIG. 4

| $\varsigma$ \ $\gamma\beta$ | OO | OL | LL | LO |
|---|---|---|---|---|
| O | | B | C | G |
| L | R | M | | Y |

FIG. 9

| COLOR | NUMBER |
|---|---|
| R | 1 |
| G | 3 |
| B | 5 |
| C | 2 |
| M | 4 |
| Y | 6 |
| W | 9 |

Inventor
Robert Wahli
By Pierce, Scheffler & Parker
Attorneys

Patented May 16, 1972

3,663,801

10 Sheets-Sheet 4

Inventor

Robert Wahli

By Pierce, Scheffler & Parker

Attorneys

Patented May 16, 1972

3,663,801

10 Sheets-Sheet 5

Inventor

Robert Wahli

By Pierce, Scheffler & Parker

Attorneys

Inventor

Robert Wahli

By [illegible], Schiffler & Parker

Attorneys

Inventor
Robert Wahli

By Pierce, Scheffler & Parker
Attorneys

Inventor
Robert Wahli
By Pierce, Scheffler & Parker
Attorneys

Inventor
Robert Wahli
By Brime, Schiffler & Parker
Attorneys

Patented May 16, 1972 3,663,801

10 Sheets-Sheet 10

Inventor

Robert Wahli

By Brian, Schiffler & Parker

Attorneys

METHOD AND APPARATUS FOR EVALUATING COLOR-CODED INFORMATION

This invention relates to a method and apparatus for checking a color-coded identification and in particular to checking such an identification against a reference code.

In one particular form of this invention, apparatus is provided which includes a photoelectric scanning device, a code converter and a code-checking device. The scanning device filters light from the color-coded identification into its additive primary components, these components each being fed into photosensitive devices. The electrical outputs of the photosensitive devices are interconnected in the code converter by means of a logic circuit with one channel for each of the additive primary colors and one for each of the subtractive primary colors so that a current pulse can only appear in the channels allocated to the additive primary colors when the single associated photosensitive device delivers a current pulse and that a current pulse only appears in the channels allocated to the subtractive primary colors when the two photosensitive devices allotted to the non-complementary additive primary color components simultaneously deliver a current pulse. Moreover, the code-checking device connected to the channels of the code converter, a device made up of a logical coincidence circuit which can be programmed by means of a code reference word, only produces a coincidence pulse at its output when the code word represented by the current pulses being fed in agrees with the code reference word in accordance with the programming.

Apparatus based on the invention may be further characterized by the fact that the electrical outputs of the photosensitive devices in the logic circuit of the code converter are interconnected with the two color-type channels (additive and subtractive) so that a current pulse only appears in one of the two color-type channels when a current pulse exists in one of the channels allocated to the additive primary colors and similarly that a current pulse only appears in the other of the two color-type channels when a current pulse appears in one of the channels allocated to the subtractive primary colors.

The binary coded pulses in this apparatus appear in parallel but equivalent installations with series presentation of the binary pulses are possible.

Apparatus utilizing this invention is especially suitable for checking color-coded objects such as ampoules, and due to its high reliability from the point of view of the code used it is ideal for use in the pharmaceutical industry.

Ampoules are produced on an automatic machine which fills and seals them, whereupon they are sterilized, checked visually for impurities (e.g., packed in boxes for storage. The ampoules are not marked at this stage but are only labelled immediately before delivery since the country of destination and hence the required labelling are normally not known at the time of manufacture. A considerable interval of time could therefore exist between filling and shipment, during which time the ampoule is exposed to all kinds of danger. Even at the sterilization and checking stages it is already possible for an ampoule to be left lying about and then to get mixed up with another manufacturing batch. A similar situation could also occur at the machine. Although the ampoules may look identical externally their contents could be entirely different, a fact which under certain circumstances could prove fatal.

As a safeguard against such dangers every ampoule is marked with a code word at the filling station itself which unmistakeably identifies the contents of the ampoule. The most suitable marking takes the form of a number of colored rings around the ampoule neck. At the labelling machine, for instance, these marked ampoules pass through a checking station which verifies the code and eliminates any ampoule with colors deviating from the reference code.

Preferred embodiments of the invention will now be described in greater detail with the aid of the drawings as follows:

FIG. 2 is a "truth table" for a code utilizing the colors shown in FIG. 1,

FIG. 3 is a "truth table" for decoding color measurement signals,

FIG. 4 is a Karnaugh diagram for decoding the color measurement signals,

Figure 5:
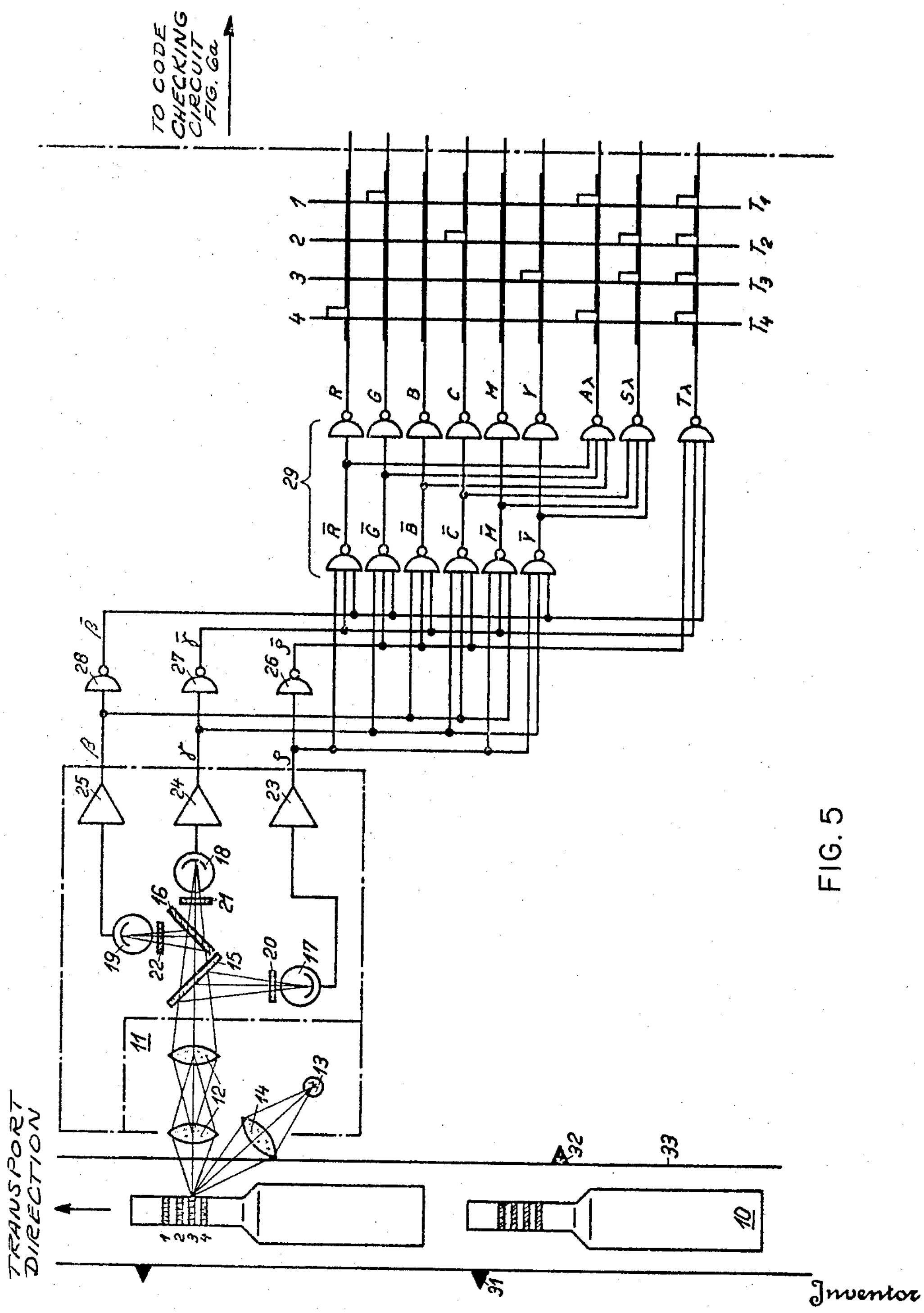
Figure 6A:
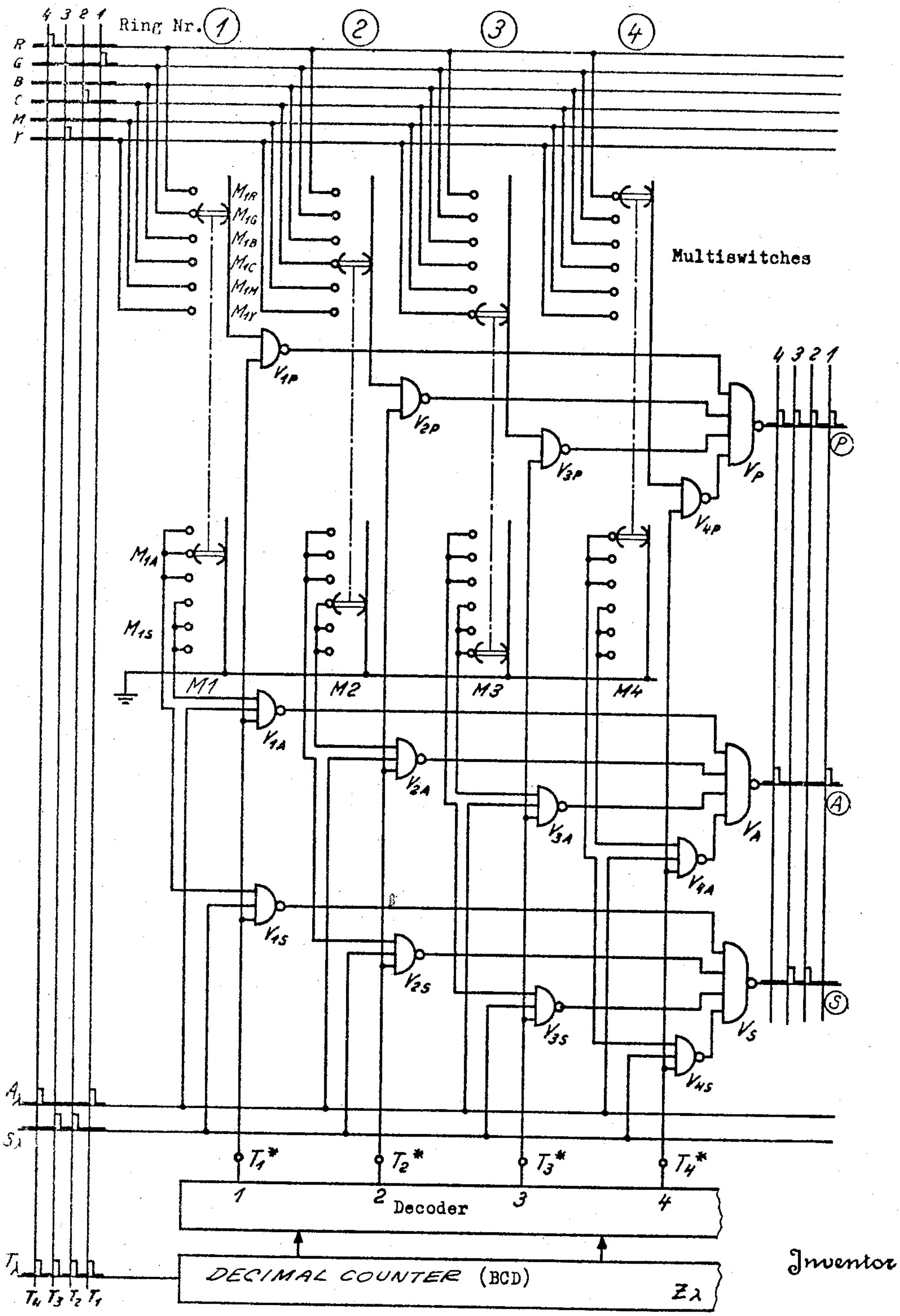
Figures 6B, 7:
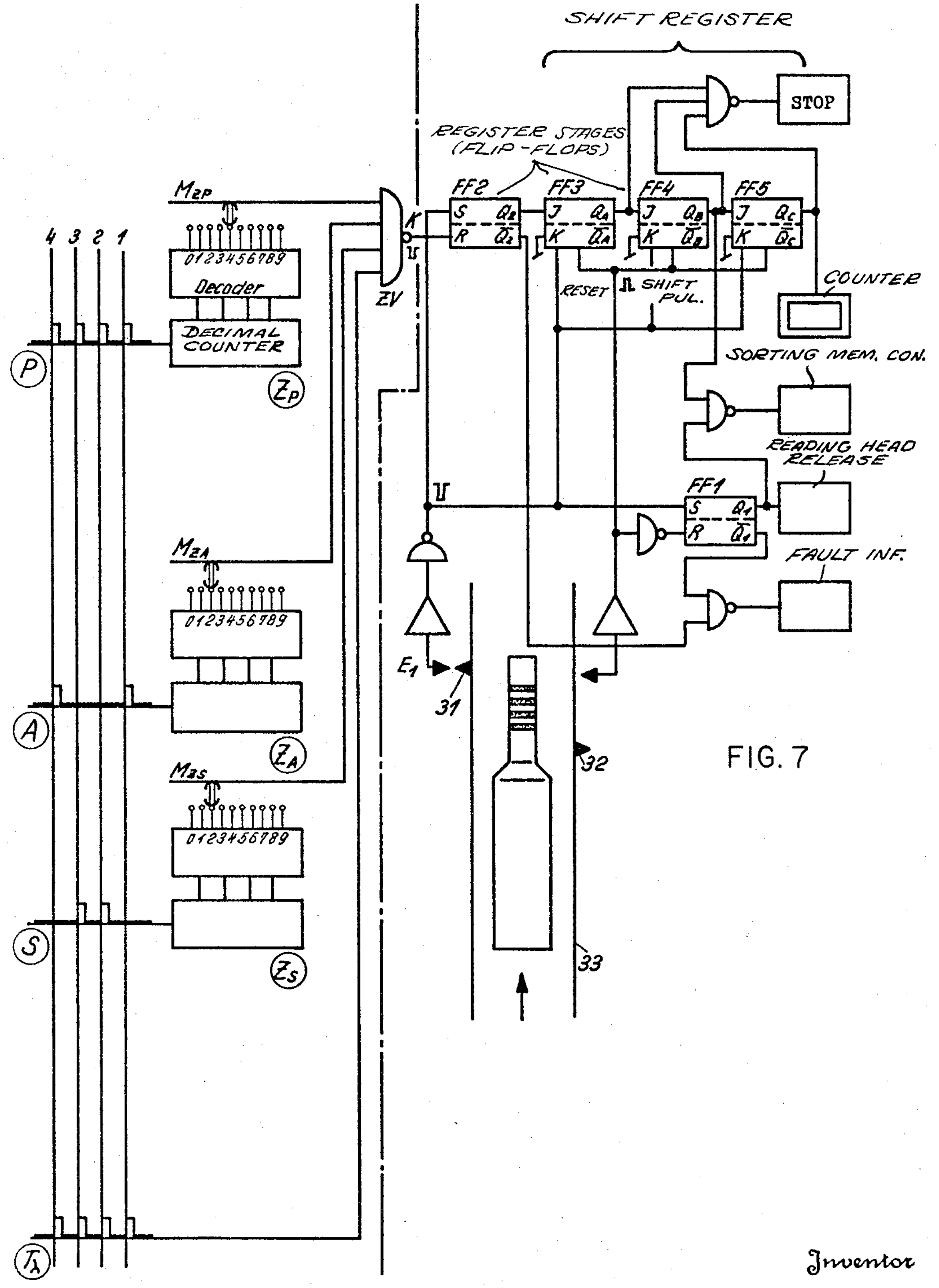
Figure 8:
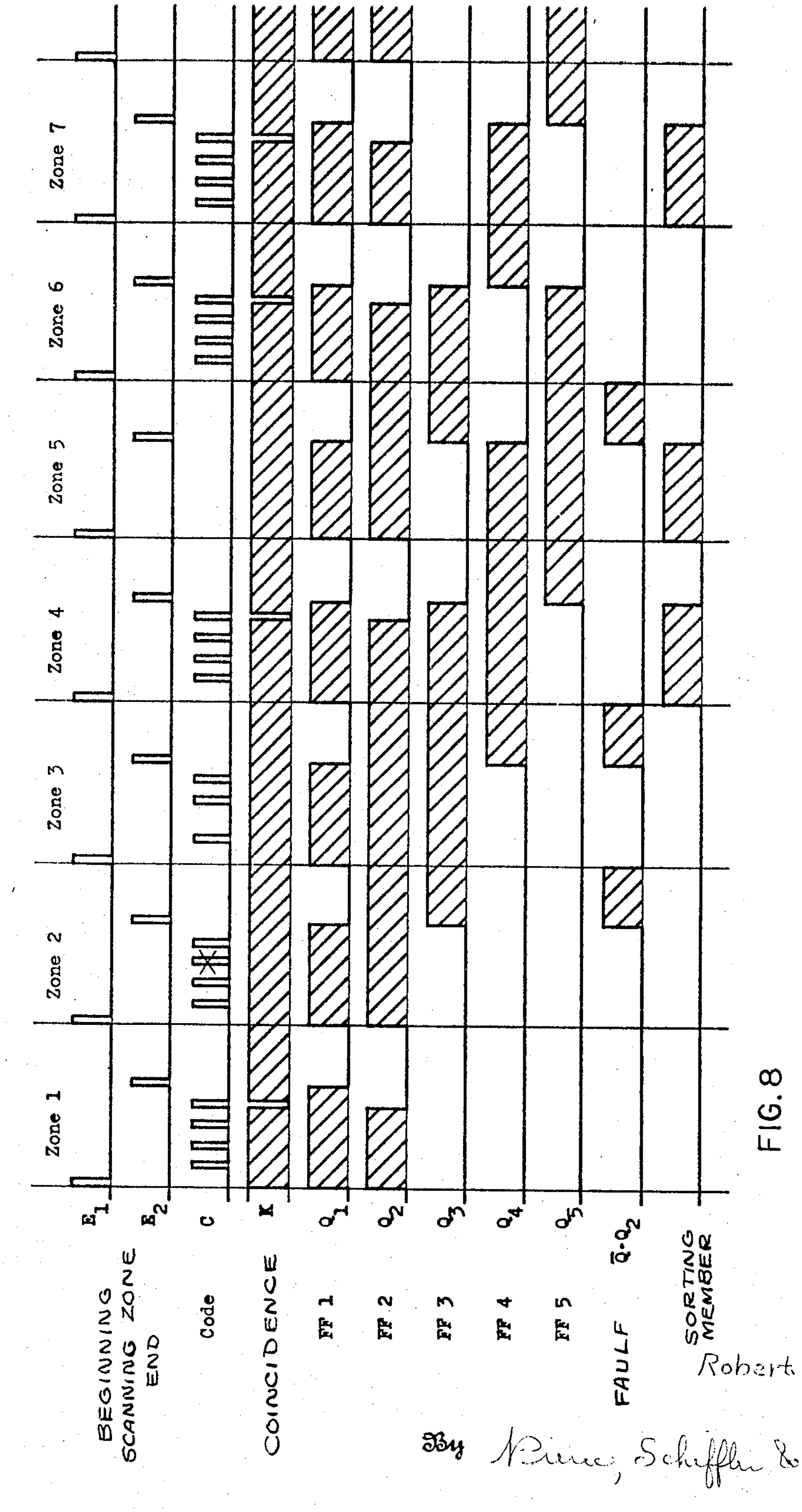
Figure 10A:
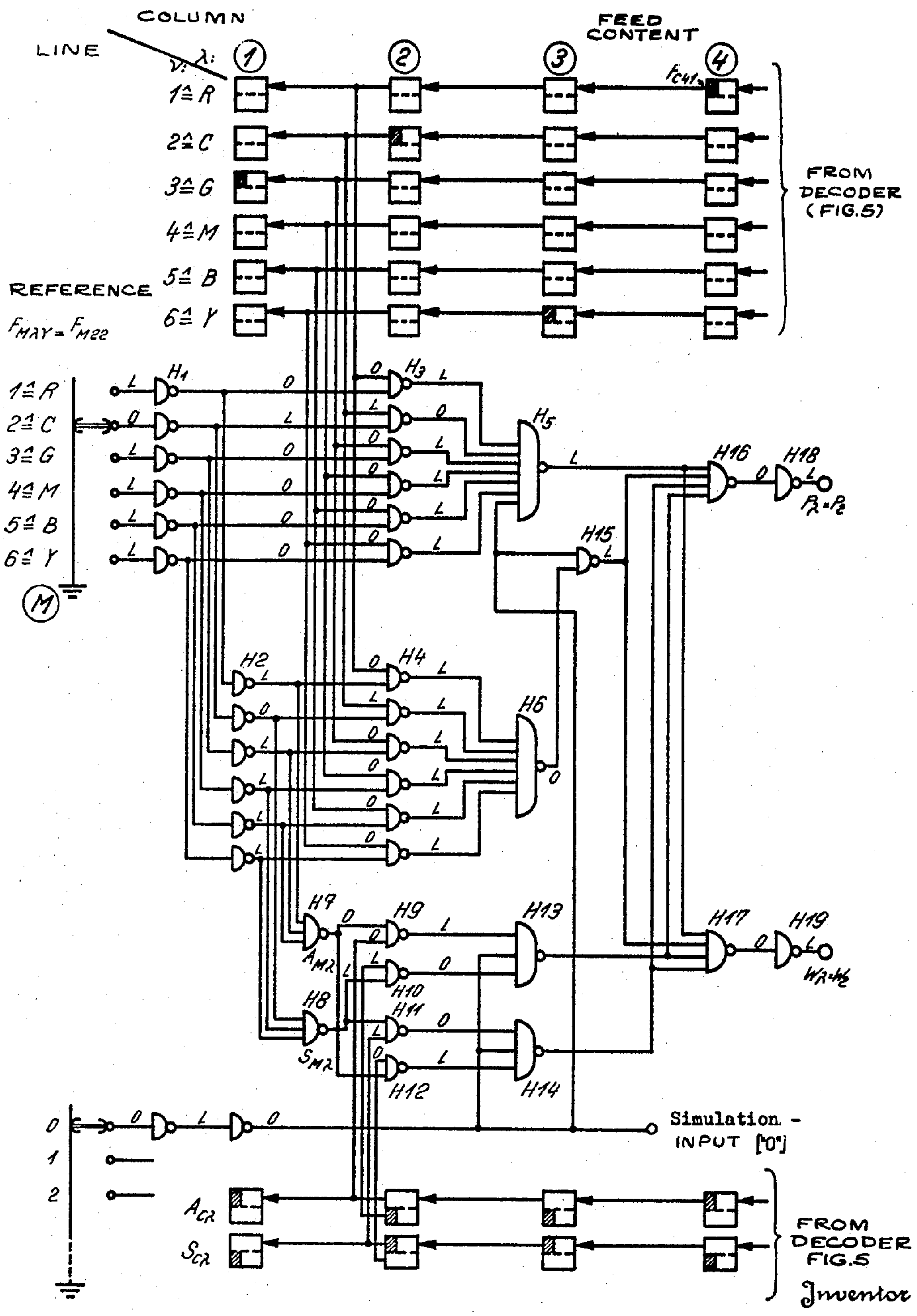
Figure 10B:
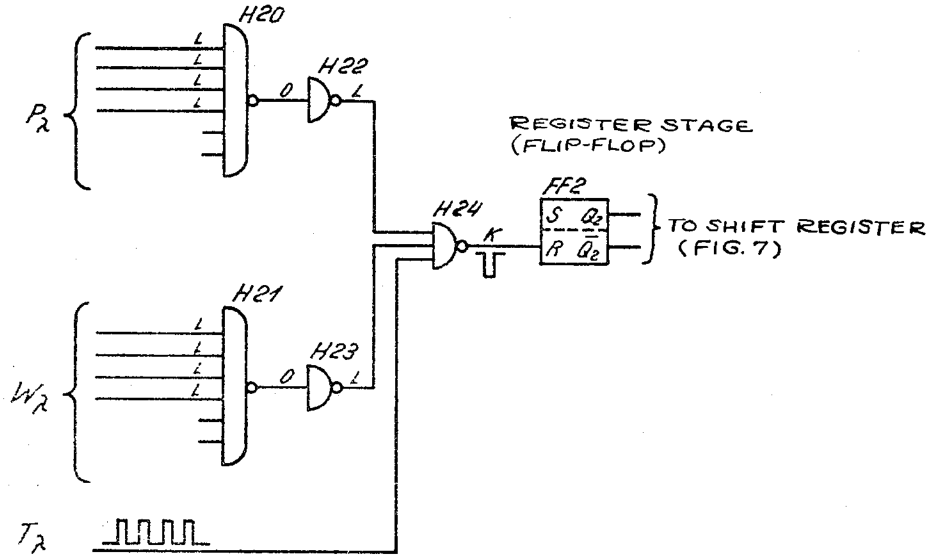
Figure 11:
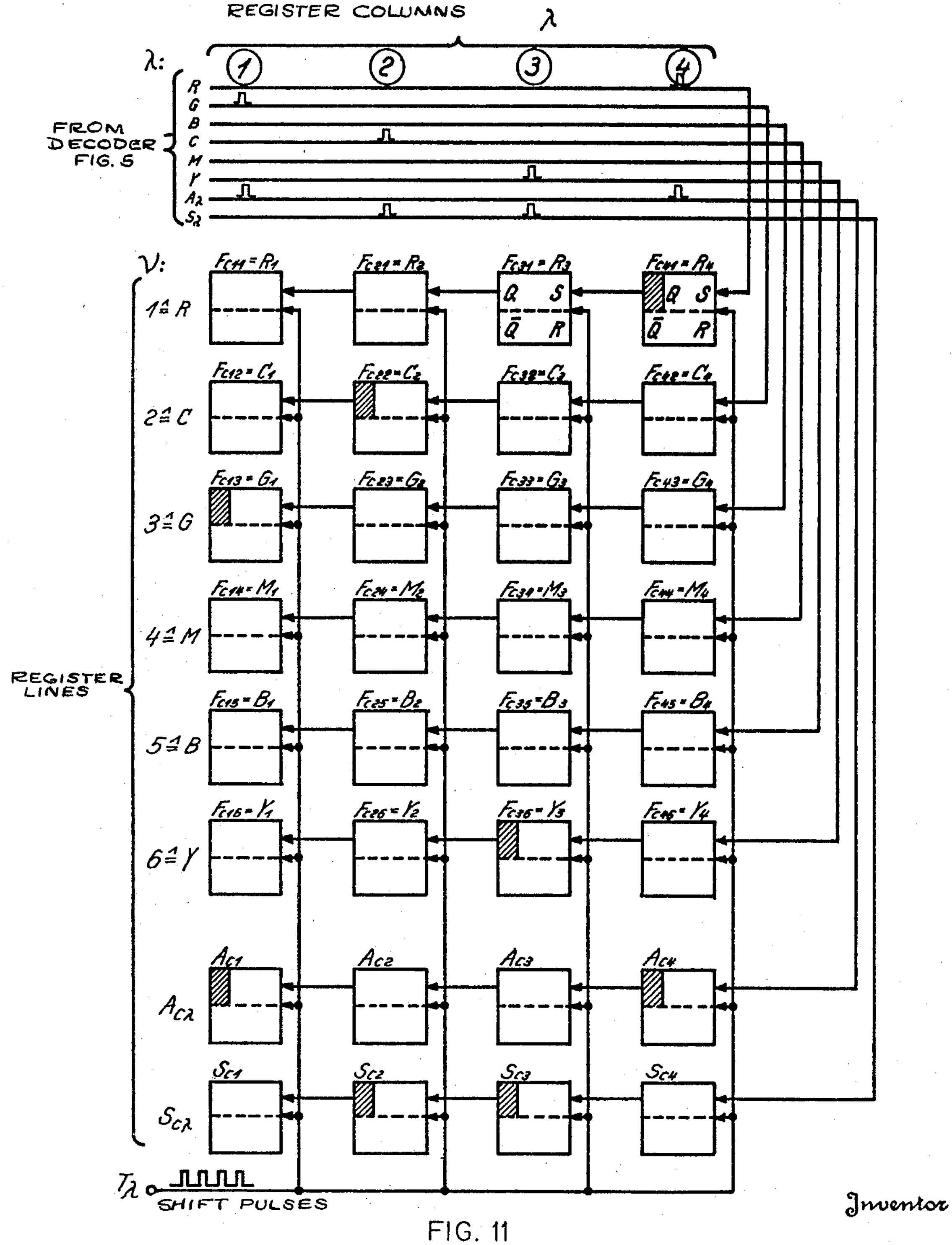

FIGS. 5, 6*a*, 6*b* and 7 comprise a circuit diagram of equipment in accordance with this invention, FIG. 8 is a diagram explaining the principle of the circuit of FIG. 6, FIG. 9 is a table showing the numbers allocated to the code colors, FIGS. 10*a* and 10*b* illustrate a further form of checking device, and FIG. 11 is a detailed representation of part of FIG. 10*a*.

Figure 1:
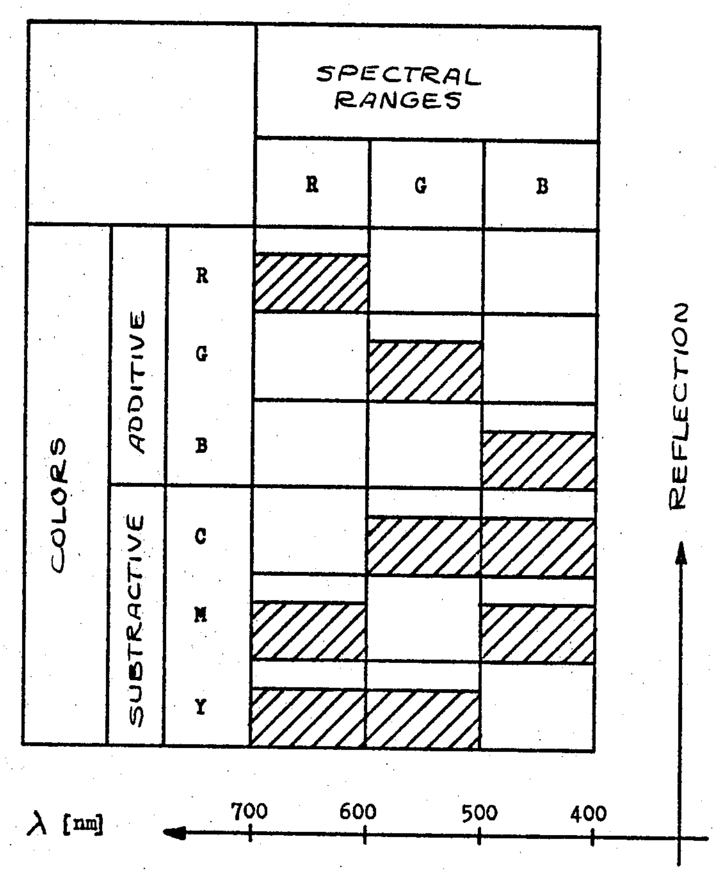
FIG. 1 shows the relationship between primary and complementary colors.

FIG. 1 illustrates the spectral ranges of the primary (additive) colors red, green and blue and the complementary (subtractive) colors cyan, magenta and yellow. If white light is projected onto dichroic filters each designed to reflect a different one of the three primary colors then it will be observed that the filters will transmit the complementary colors, for example, the filter reflecting red light will transmit cyan, that is green and blue, the filter reflecting green light will transmit magenta, that is red and blue and the filter reflecting blue light will transmit yellow, that is red and green.

Such filters are used in a preferred embodiment of the invention to decode information which is in the form of color-coded rings around the necks of ampoules. The color-coded rings are exposed to white light and the light reflected by the colored rings is analyzed by those filters disposed in front of three photoelectric cells which produce different combinations of signals for different combinations of colored rings in accordance with the truth table of FIG. 2. Every colored ring corresponds to a binary word with three bits when evaluated logically. Of the eight possibilities provided by the three bits six are used, the combinations 000 (black) and LLL (white) not being used.

Apparatus for decoding the information represented by color-coded rings about the necks of ampoules is shown in FIG. 5. The ampoules 10 are moved past a reading head 11 at an approximately constant speed by a conveyor belt 33. The necks of the ampoules are arranged to lie between a starting mark 31 and finishing mark 32. The reading head 11 contains a light source 13 and a combined collimating and projection lens 14 which focuses the coil of the lamp at a predetermined position to illuminate each of the color-coded rings 1, 2, 3 and 4 on the necks of the passing ampoules in turn and a set of reading lenses 12. The incident light is diffusely reflected by a color ring and imaged by the reading optics 12 onto three photomultipliers 17, 18 and 19 by two dichroic filters 15 and 16. The first dichroic filter 15 reflects red light and allows the remainder (green and blue) to pass. Blue light is reflected by the second dichroic filter 16, so that only green light remains. To increase the color selectivity additional fairly narrow pass band filters 20, 21 and 22 are fitted in front of photomultipliers 17, 18 and 19.

The individual beams of colored light passed by the dichroic filters are converted into electric currents by the photomultipliers 17, 18 and 19 and subsequently into logic voltage signals $\rho, \gamma, \beta$ by the threshold amplifiers 23, 24 and 25. The intention is to work with positive logic levels so that a positive voltage of nominally 5 V represents a logic one (L) while zero potential represents a logic zero (0).

Inverter elements 26, 27 and 28 first transform the logic signals $\rho, \gamma$ and $\beta$ into their inversions $\overline{\rho}, \overline{\gamma}$ and $\overline{\beta}$ and these are combined with the uninverted signals by logic elements 29 in accordance with the truth table in FIG. 3 and the Karnaugh chart in FIG. 4 to provide output signals which represent the six code colors used. If, for instance, the photoelectric system scans a yellow ring (Y) the signals $\rho = L$ and $\gamma = L$ and $\beta = 0$ result, which produce an output signal $$Y = \rho \cdot \gamma \cdot \overline{\beta} = L \cdot L \cdot L = L$$

in the yellow channel.

Signals A and S are derived from the color signals R, G, B, C, M and Y, which are defined as follows in Boolean algebra:

$$A = R + G + B$$
$$S = C + M + Y$$

Accordingly $A$ represents an additive primary color and $S$ a subtractive complementary one.

A further signal $T_\lambda$ is produced from the signals $\rho$, $\gamma$ and $\beta$ which satisfies the relationship $$T_\lambda = \rho + \gamma + \beta$$

It is used as a pulse signal for synchronization. A comparison with the Karnaugh chart (FIG. 4) reveals that the definition $T_\lambda$ also applies to the case $$\rho \cdot \gamma \cdot \beta = LLL$$

which corresponds to white which is a color not used in the color coding of the rings. The occurrence of this combination would therefore indicate an error. The presence of this combination produces a superfluous synchronizing signal which causes the ampoule being checked to be removed; this will be demonstrated later on with the aid of an example.

A code checking circuit is illustrated in FIG. 6a and 6b, the color-coded rings to be checked are assumed to be G C Y R (green, cyan, yellow and red). The first code ring (G) is at the head end of the ampoule neck (FIG. 5). As soon as this ring is scanned by the reading head a first synchronizing pulse $T_1$ appears in the pulse channel $T_\lambda$. The output pulse also occurs in the channel G of the decoding circuit (FIG. 5), i.e., $F_1 = G$. A two pole Multi-way switch is allocated to every color ring in the checking circuit. Let it be supposed that the first of these switches $M_1$ is at position $M_{1G}$. This allows the color signal $F_1 = G$ to reach a coincidence gate $V_{1P}$ via the switch contact $M_{1G}$, a synchronizing pulse $T_1^*$ being applied to the other input of the gate $V_{1P}$. This pulse T* is derived from $T_1$ by a decimal counter which is reset at the beginning of a scanning cycle and provides synchronizing pulses to the checking circuit in response to receipt of the $T_\lambda$ pulses from the decoding circuit of FIG. 5. The counter could, for instance, consist of four flip-flop stages whose settings could be read to provide a decimal count. Coincidence of the color signal $F_1 = G$ and the synchronizing pulse $T_1^*$ causes the gate $V_{1P}$ to provide zero potential at its output so that a logic one i.e., an "L" signal is provided at the output of gate $V_P$. The pulse from gate $V_P$ is fed into the decimal counter $Z_P$ of that part of the checking circuit depicted in FIG. 6b; this counter having been reset when scanning starts.

Simultaneously with the setting of the counter $Z_P$, the counter $Z_A$ is set by the coincidence of "L" signals at the input of coincidence gate $V_{1A}$. These signals comprise the $T_1^*$ synchronizing pulse, the pulse $A_1$ from the $A_\lambda$ gate of the decoding circuit shown in FIG. 5 since the color signal G represents a primary additive color, and a signal "L" from the $M_{1S}$ contacts of the switch $M_1$. These contacts are arranged to provide an "L" signal when they are not connected to earth via the moving contact which in FIG. 6a is shown connecting the $M_{1A}$ contacts to earth. Since the $M_{1A}$ contacts of switch $M_1$ are connected to earth a "0" appears at the input of gate $V_{1S}$ and also a "0" from the $S_\lambda$ gate of the decoding circuit of FIG. 5 since the color signal G is a primary and not a complementary (subtractive) color. Thus, the counter $Z_S$ is not set and at the end of scanning the first code ring the settings of the three counters $Z_P$, $Z_A$ and $Z_S$ will be:

$$Z_P = 1$$
$$Z_A = 1$$
$$Z_S = 0$$

The second color ring is C and its scanning by the reading head 11 will produce a counting pulse at the inputs of counters $Z_P$ and $Z_S$ whereas counter $Z_A$ will receive no pulse. The settings of the counters after scanning of the first two color rings is therefore:

$$Z_P = 2$$
$$Z_A = 1$$
$$Z_S = 1$$

The third color ring is again of a complementary color (Y) and its scanning by the reading head 11 sets the counters $Z_P$ and $Z_S$ but not counter $Z_A$; the settings of the counters after scanning the first three code rings is thus:

$$Z_P = 3$$
$$Z_A = 1$$
$$Z_S = 2$$

The fourth and last code ring has an additive primary color (R) and its scanning by the reading head 11 sets the counters $Z_P$ and $Z_A$ but not counter $Z_S$ so that the final counter settings are:

$$Z_P = 4$$
$$Z_A = 2$$
$$Z_S = 2$$

Each counter $Z_P$, $Z_A$ and $Z_S$ has a plurality of output terminals each assigned to a different one of the decimal digits 0 to 9. Thus a counter set to a count of 4 will provide a signal in the decimal 4 output terminal and a counter set to a count of 2 will provide a signal on the decimal 2 output terminal. The output terminals of a counter are connected to the contacts of a single pole multi-contact switch so that the single moving contact could be connected to any one of the output terminals of the counter. Before scanning of the ampoules commences these single pole multi-contact switches $M_{ZP}$, $M_{ZA}$, $M_{ZS}$ are set to the decimal values which are expected from the scanning of a predetermined color-coded combination of rings. In this example the rings are color-coded G, C, Y, R and thus comprise two rings of primary colors and two of complementary colors so that the counter $Z_A$ receiving signals from the gate $A_\lambda$ of the decoding circuit will provide a count of 2, the counter $Z_S$ receiving signals from the gate $S_\lambda$ of the decoding circuit will also provide a count of 2 and the counter $Z_P$ will provide a count of the total number of rings scanned, i.e., 4. However, upon the scanning of the fourth ring the synchronizing pulse $T_4$ is not only applied to gate $V_{4A}$ to pass a signal on to the counter $Z_A$ but is also applied to coincidence gate $Z_V$ so that four logical "L" signals appear at the four inputs to this gate to provide an output signal K therefrom which resets the bistable circuit FF2 shown in FIG. 7.

The presence of the signal K indicates that the combination of color rings conforms to the code combination set up on the switches $M_1$ to $M_4$ and that the correct number of rings have been scanned as well as verifying that the rings included the predetermined number of additive and subtractive colors. Also the presence of the signal K indicates that the checking circuit is operating correctly. Thus the following conditions have to be satisfied before the code word corresponding to the color-coded combination G, C, Y, R is pronounced correct:

The color of every ring on the ampoule must agree with the predetermined reference color represented by the setting of the appropriate one of the switches $M_{1P}$ to $M_{4P}$.

Every colored ring must satisfy the programmed classification as an additive or a subtractive primary color as determined by the setting of the switches $M_{1A}$ to $M_{4A}$ or $M_{1S}$ to $M_{4S}$.

During the scanning of the last colored ring the counter settings must conform to the programmed values as represented by the settings of the switches $M_{ZP}$, $M_{ZA}$ and $M_{ZS}$.

The synchronizing pulses T may only occur while the colored rings are being scanned so that the number of synchronizing pulses coincides with the number of rings.

Such a set of conditions makes it extremely unlikely that an incorrectly color-coded ampoule could slip past the reading head unrecognized. The system reacts with such sensitivity to the slightest flaw that even the smallest defect, for instance in the electronic checking circuit, automatically causes the ampoule being examined to be rejected.

The pulse K produced in the section of the checking circuit shown in FIG. 6b is further processed in the circuit shown in FIG. 7. This further processing is described with the aid of FIG. 8; not only the detection of the correct code combination is discussed but also some typical faults. When the ampoule enters the scanning zone (which is indicated once again in FIG. 7 but obviously coincides with that in FIG. 4) a marker signal $E_1$ is produced inductively or by means of a photoelectric cell by the marks 31 on the conveyor belt which sets the two flip-flops FF 1 and FF 2. FF 1 switches in the photomultipliers and the threshold amplifiers in the reading head while FF 2 energizes the scanning circuit. If the code on the ampoule is correct the coincidence pulse K is produced at the same time as the fourth color ring is being scanned, this pulse resetting FF 2. The output of FF 2 controls a multi-element shift register whose timing pulse $E_2$ is derived from the end mark 32 of the scanning zone. Assuming a correct code again (FIG. 8, zone 1) a "0" appears at the J input of FF 3 when the shift pulse $E_2$ occurs. The register stage FF 3 therefore stores a "0", noughts also representing the contents of the stages FF 4 and FF 5.

Should the next ampoule (FIG. 8, zone 2) contain an incorrectly colored ring, for example the third ring being colored B instead of Y no K pulse is produced. The gates $V_{3P}$ and $V_{3A}$ then fail to produce an output pulse so that the counters $Z_P$ and $Z_A$ each receive one pulse too few. In this case the output pulse K is absent and FF 2 is not reset. The shift pulse $E_2$, which is initiated by the end marking 32 as the second ampoule passes, therefore finds a binary L at the J input of FF3 and this is stored. The "0" stored during the preceding cycle then passes into FF 4 which in turn transfers the "0" stored so far to FF 5.

In the case of the next ampoule (FIG. 8, zone 3) one of the color rings in the code is missing. As a result the output pulse K is again absent so that FF 3 once more stores an "L". The "L" from the preceding cycle is now transferred to FF 4 and the "0" previously stored in FF 4 is passed on to FF 5.

The next ampoule (FIG. 8, zone 4) bears the correct code. When the fourth color ring is being scanned the output signal K is produced and resets FF 2. The next shift cycle of the register then inserts a "0" into FF 3, an "L" into FF 4 and an "L" into FF 5.

In zone 5 (FIG. 8) an unmarked ampoule occurs or the ampoule is missing altogether. Once again the output signal K is not produced and as a result the ampoule is designated faulty.

Finally, the case will be investigated when a synchronizing pulse $T_\lambda$ is incorrectly produced from the combination $\rho=\gamma=\beta=L$ which corresponds to white (W). A colored ring could in fact be white, which means that the code cannot be right. The fault is detected because no decoded color signal occurs together with the associated synchronizing pulse. Should this pulse result from a defect in the electronic system between the scanning of two color rings then the counter $Z_\lambda$ will have its count increased by one unit and the synchronizing pulses $T_1^-$ to $T_4^-$ will be generated in the wrong order. Thus coincidence between the signals produced by the colored rings and the synchronizing pulses produced by the counter $Z_\lambda$ will not occur and the application of the color and synchronizing signals will now be out of step. The only possible exception could arise when all the following rings have the same color. In this case the ampoule could under certain circumstances still be graded as correct (depending on the time the signal takes to pass through the various channels). This is in fact right, in spite of the superfluous synchronous pulse. In the worst case a "good" ampoule would then be rejected by mistake.

It has therefore been established that a fault in the coding always results in the absence of an output pulse K. This results in the storage of a binary "L" in FF 3 at the instant when the end mark 32 of the scanning zone for the ampoule being scanned passes the relevant scanning point (shift pulse $E_2$). This binary "L" is then shifted through the various stages of the shift register in time with the scanning of subsequent ampoules.

The shift register is required because the sorting of the ampoules into "good" and "bad" cannot take place at the scanning point itself for design reasons so that it has to be carried out at some other place. The "length" or number of stages in the register is not subject to any limitations, although on the grounds of economy and safety the faulty ampoules should be directed into a reject collector as soon as possible after they have been identified. For this purpose the output of any register stage could be used to control a sorting member along the conveyor belt which deflects the ampoules into separate channels in accordance with their "good" or "bad" grading.

By way of example the output $Q_B$ of FF 4 is responsible for controlling the sorting member. To ensure that the member can return to its normal position to allow passage of "good" ampoules during the interval between the arrival of successive ampoules, the output signal of FF 4 and the output from FF 1 are connected to a coincidence gate whose output controls the sorting member so that the sorting member remains at the "reject" position for as long as an ampoule is present in the scanning zone. In practical designs a time-lag control may become necessary.

In addition to the actuation of the sorting member, the shift register can also carry out a number of other tasks, for example

- every time a faulty ampoule is detected it can operate an optical or an acoustic alarm,
- operate a counter for totalling the number of faulty ampoules,
- whenever several faulty ampoules follow one another in quick succession it can automatically stop a labelling machine applying labels to the ampoules besides operating an optical or acoustic warning signal.

The code-checking circuit in FIG. 6 can of course be modified, the version illustrated being selected in particular for ease of understanding.

The principle of operation has been explained with reference to a four-position code. It is fairly evident, however, that a relatively modest extension of the equipment would allow up to nine positions to be checked. The additional outlay mainly involves increasing the number of logic circuits associated with code checking circuits of FIGS. *6a* and *6b* and of the circuits associated with the decoding circuit of FIG. 5. The number of distinct combinations available using six colors totals, for instance

| | |
|---|---|
| with 4 positions: | 1,296 possibilities, |
| with 6 positions: | 46,656 possibilities and |
| with 8 positions: | 1,679,616 possibilities. |

The "color" white (W) has deliberately not been included so far since it is not an additive or subtractive color. It is represented by the simultaneous occurrence binary "L" in the $\rho$, $\gamma$ and $\beta$ channels of FIG. 5. In principle, apart from the additional equipment required and the exclusion of signals representing white to indicate an error there is no reason why white should be excluded. The inclusion of white as the seventh color would mean that the required number of 250 distinction possibilities could already be achieved with three positions (colored rings) since $7^3 = 343$. (Four positions would provide 2,401 possibilities).

For practical work it is an advantage to allocate decimal numbers to the various colors as in the color coding of resistors. The positions of the switches $M_1$ to $M_4$ are in fact assigned decimal numbers and the decoding of numbers with IBM punched cards is easier than letters. Moreover a number is simpler to note than a corresponding combination of letters.

A proposed decimal number code for colors can be found in FIG. 9. To make them easier to remember the additive primary colors are given odd numbers and the subtractive colors even numbers. The number 9 is reserved for the special case W.

A code made up of four colored rings is thus sufficient to identify every ampoule unmistakeably by using seven numbers. In the case of the example quoted which makes use of colors G, C, Y and R the identification number can be obtained from the following table:

| Color: | | Composition: |
|---|---|---|
| $F_1F_2F_3F_4$ | / | P A S |
| G C Y R | / | 4 2 2 |
| 3 2 6 1 | / | 4 2 2 |

The set of FIGS. 422 after the oblique stroke provides information concerning the composition of the "color word" GCYR ≙ 3,261 and corresponds to the anticipated counter positions in $Z_P$, $Z_A$ and $Z_S$ and also the required settings of the switches $M_{ZP}$, $M_{ZA}$ and $M_{ZS}$; this number can easily be checked for correctness as follows:

*P* must correspond to the number of colored rings and thus to the number of positions of the color word before the oblique stroke.

*A* is the number of additive colors which agrees with the number of odd numbers in the color word.

*S* indicates the number of subtractive colors which agrees with the number of even numbers in the color word.

It is also evident that the number *P* must also correspond to the sum of *A* and *S*, i.e., $P = A + S$ or $4 = 2 + 2$. Hence, if the color word is known the "composition word" can easily be reconstructed at any time or checked for correctness.

The table has to be expanded if white (W) is to be included. Since white is neither an additive nor a subtractive color a new class N is included in addition to *A* and *S*, as already mentioned. With the inclusion of white the table becomes:
in which:

| Color: | | Composition: |
|---|---|---|
| F F F F | / | P A S N |
| W B W M | / | 4 1 1 2 |
| 9 5 9 4 | / | 4 1 1 2 |

*N* equals the number of FIGS. "9" in the color word,
*P* equals the sum of *A*, *S* and *N*.

The setting of the switches $M_1$ to $M_4$ used in the foregoing embodiment does not, of course, represent the only practical way in which the color word is set up. If space permits and the user would like a clear display of the color word a complete system of illuminated push buttons could be installed, the depressed buttons lighting up in the color of the appropriate colored ring.

Labelling of the ampoules could be controlled by data entered into the apparatus by an IBM punched card containing instructions (e.g., quantity, language on the label, etc.) and data for use when making out the account for the order. The next logical step is to include in the punched card the decimal coded color code for the ampoules being checked. This development offers the major advantage of improved reliability since the human element and the mistakes that could occur during manual setting of the switches $M_1$ to $M_4$, $M_{ZP}$, $M_{ZA}$ and $M_{ZS}$ are largely eliminated. The setting of the various switches, $M_1$ to $M_4$, and $M_{ZP}$, $M_{ZA}$ and $M_{ZS}$ can also be simplified and shortened since the entire setting up of the reference color word is accomplished in one operation and no additional check of the settings is required.

Upon closer examination the color code used exhibits some interesting mathematical features and properties; these are dealt with below.

As already demonstrated, the major characteristic of the six-color code lies in its division into two groups of three colors in the visible range and in the conversion of the analogue data in the form of colored rings into binary combinations of signals. As a safeguard against errors in coding the fact that every color is either additive or the subtractive is exploited to provide a redundancy check information. This subdivision of the coding into two classes corresponding to the additive and subtractive colors holds out possibilities which have not yet been mentioned, namely the creation of groups within a given code, each group having a predetermined number of code positions. The mathematical laws emerge from the following considerations.

The code is made up of the (color) elements R, G, B, C, M and Y so that the following Boolean algebraic expressions apply:

$A = R + G + B$ additive colors
$S = C + M + Y$ subtractive colors

It can be demonstrated that the composition of the code is based on the binomial theorem. Within the total number $P(N)$ of all the possible permutations with a given number of colored rings, sets can be formed by L." permutations which, for instance, only contain elements of class *A* or only one element of class *S*, etc.

In the case of n colored rings $(n + 1)$ sets are possible. The number of permutations within every set is determined by the number of colored rings and the binomial coefficient $a_{n-k,k}$ so that:

$$P_{n-k,k}(nk,k\ (n)) = a_{n-k,k} \cdot 3^n$$

The binomial coefficients obey the relationship:

$$a_{n-k,k} = \binom{n}{k}$$

These can be clearly presented in the well known Pascal triangle.

This creation of sets can assume practical significance when additional information is to be included in the coded information, for instance if the following are to be included:

Year of manufacture,
Factory within a group where manufacture takes place,
Type of product.

As already mentioned the code-checking equipment in FIG. 6*a* and 6*b* can be replaced by other designs. The circuit of FIG. 10*a* and 10*b* with a multi-line shift register is particularly appropriate; the shift register being shown in greater detail in FIG. 11.

As illustrated in FIGS. 10*a* and 11, a four-stage shift register with eight lines is provided. Since there are six possible colors and two additional bits representing additive or subtractive colors for every ring of the ampoule, a total of eight storage cells are available for each code ring. Every one of these cells is identified by an address $F_{C\lambda\nu}$ made up of its position with respect to the columns λ and the lines ν of the register. The index C indicates the origin of contents of the cell with respect to the scanned code. The storage cells for the redundancy bits are designated $A_{C\lambda}$ and $S_{C\lambda}$.

The synchronizing pulses $T_\lambda$ are used as shift pulse for the register and all the cells are cleared by the start pulse $E_1$ generated at the beginning of the scanning zone (FIGS. 7 and 8). For the sake of clarity reset lines for the storage cells have not been included in the drawing. Storage of the code word GCYR ≙ 3,261 will now be explained.

The first bit to appear from the reading head 11 and decoding circuit of FIG. 5 is the G bit, which is inserted into the storage cell $G_4$ of the register line G by the shift pulse $T_1$. The same happens to the redundancy bit associated with the G bit, the former being stored as a binary "L" in cell $A_{C4}$ after the first pulse $T_1$. The remaining storage cells of the fourth column of the register all contain a "0.".

The next shift pulse $T_2$ transfers the existing contents of the cells in the fourth column into cells of the third column. An "L" is now stored in the cells of both the C and $S_{C\lambda}$ lines of the fourth column. The remaining register cells of the fourth column store zeros.

The third shift pulse $T_3$ next transfers the contents of the cells in the third column into the cells of the second column and the contents of the cells of the fourth column into the cells of the third column. The cells of the fourth column now receive an "L" bit in both the Y and $S_{C\lambda}$ lines, the remaining storage cells in the fourth column store a "0."

After the fourth shift pulse the G bit has reached the first column, the C bit the second column and the Y bit the third column. An "L" is stored in the R line of the fourth column. "L" bits are also stored in the $A_{C1}$ and $A_{C4}$ cells, in the $A_{C\lambda}$ line and in the $S_{C2}$ and $S_{C3}$ cells of the $S_{C\lambda}$ line.

The color word complete with its redundancy bits is now entirely stored in the register so that it can be compared with the reference word set up in the code-checking circuit. The code-checking circuit for a single register column (in the example column No. 2) is shown in FIG. 10*a*.

The reference pulse $F_{M\lambda\nu} = F_{M22} ≙ C$ at the output of the inverter stage H 1 is derived from a selector switch M. A check is carried out in the gate stage H 3 as to whether the contents of the register cell $F_{C\lambda\nu} = F_{C22} \triangleq C_2$ at line C agree with the reference:

$$h_{32} = \overline{(F_{M\lambda\nu} \cdot F_{C\lambda\nu})} = \overline{F_{M22} \cdot F_{C22}} \qquad (1)$$

in which $h_{32}$ is the logical state of the gate $H_3$ in line No. 2 of the gate stage H 3. The signal $h_{32}$ = "0" if coincidence occurs. The output condition of all the remaining gates of stage H 3 is "L" since the scanning input $F_{M\lambda\nu} = F_{M22}$ ($\nu = 1...6, \nu \neq 2$) is at zero potential. The output signal $h_5$ of the gate H 5 satisfies the relationship:

$$h_5 = \overline{\overline{(F_{M21} \cdot F_{C21})} \cdot \overline{(F_{M22} \cdot F_{C22})} \cdot \overline{(F_{M23} \cdot F_{C23})} \cdot \overline{(F_{M24} \cdot F_{C24})} \cdot \overline{(F_{M25} \cdot F_{C25})} \cdot \overline{(F_{M26} \cdot F_{C26})}}$$

$$= (F_{M21} \cdot F_{C21}) + (F_{M22} \cdot F_{C22}) + (F_{M23} \cdot F_{C23}) + (F_{M24} \cdot F_{C24}) + (F_{M25} \cdot F_{C25}) + (F_{M26} \cdot F_{C26}) \qquad (2)$$

(The so-called simulation input is at first not taken into account in the consideration below). Owing to the way in which the selector switch M is connected only one single term i.e., $F_{M\lambda\nu}$ can assume the value "L": This is the one whose associated contact is earthed through the wiper of the selector switch M (in the example $F_{M22}$). The coincidence check is therefore unequivocal.

As a double check the contents of the remainder of the storage cells in the second column of the register are verified for anticoincidence through the gate stages H 4 and H 6, the checking criterion being:

$$h_6 = \overline{\overline{(\overline{F_{M21}} \cdot F_{C21})} \cdot \overline{(\overline{F_{M22}} \cdot F_{C22})} \cdot \overline{(\overline{F_{M23}} \cdot F_{C23})} \cdot \overline{(\overline{F_{M24}} \cdot F_{C24})} \cdot \overline{(\overline{F_{M25}} \cdot F_{C25})} \cdot \overline{(\overline{F_{M26}} \cdot F_{C26})}}$$

$$= (\overline{F_{M21}} \cdot F_{C21}) + (\overline{F_{M22}} \cdot F_{C22}) + (\overline{F_{M23}} \cdot F_{C23}) + (\overline{F_{M24}} \cdot F_{C24}) + (\overline{F_{M25}} \cdot F_{C25}) + (\overline{F_{M26}} \cdot F_{C26}) \qquad (3)$$

The result of $h_6$ must be "0" for the anticoincidence to be satisfied. The reference function $F_{M\lambda\nu}$ only equals "L" in the case of $F_{M22}$. Accordingly the storage function $F_{C\lambda\nu}$ must equal "0" everywhere except for $F_{C22}$ if the expressions between brackets in equation (3) are to equal "0" too. In the case of $F_{C22}$ this function can take on any value since $\overline{F_{M22}}$ = "0". The stages H 4 and H 6 therefore provide a clear anticoincidence check.

The redundancy bits $A_{C\lambda} = A_{C2}$ and $S_{C\lambda} = S_{C2}$ are checked by the gate stages H 7 ... H 14. In the example chosen $A_{C2}$="0" and $S_{C2}$="L."

The reference function $$h_7 = \overline{\overline{F_{M21}} \cdot \overline{F_{M23}} \cdot \overline{F_{M25}}} = F_{M21} + F_{M23} + F_{M25} = A_{M2} \qquad (4)$$

is produced in the gate stage H 7 and denotes an additive redundancy bit. Similarly the gate stage H 8 produces the subtractive redundancy bit $$h_8 = \overline{\overline{F_{M22}} \cdot \overline{F_{M24}} \cdot \overline{F_{M26}}} = F_{M22} + F_{M24} + F_{M26} = S_{M2} \qquad (5)$$

Together with the stage H 13 the stages H 9 and H 10 form the EXCLUSIVE-OR function:

$$h_{13} = \overline{(\overline{A_{M2}} \cdot A_{C2}) \cdot (\overline{S_{M2}} \cdot \overline{A_{C2}})} \qquad (6)$$

Taking the fact into account that $$A_{M\lambda} = \overline{S_{M\lambda}} \text{ and } \overline{A_{M\lambda}} = S_{M\lambda} \qquad (7)$$

then $$h_{13} = (A_{M2} \cdot A_{C2}) + (\overline{A_{M2}} \cdot \overline{A_{C2}}) \qquad (8)$$

Similarly the gate stages H 11, H 12 and H 14 produce the EXCLUSIVE-OR function:

$$h_{14} = (S_{M2} \cdot S_{C2}) + (\overline{S_{M2}} \cdot \overline{S_{C2}}) \qquad (9)$$

The two redundancy bits $A_C$ and $S_C$ cancel one another out:

$$A_{C\lambda} = \overline{S_{C\lambda}} \qquad (10)$$

Thus if the two storage functions $A_{C\lambda}$ and $S_{C\lambda}$ do not agree with the reference functions $A_{M\lambda}$ and $S_{M\lambda}$ or if they are individually equal an error is present with manifests itself in the expression $h_{13}$="0" or $h_{14} \neq$ "0."

The signals for the color-coincidence, color-anticoincidence and redundancy-bit checks are processed in the gate stages H 16 and H 17, these being interlocked as a safety precaution. The relevant functions (still neglecting the simulation input assumed to be="L"):

$$\overline{P_2} = h_{16} = \overline{h_5 \cdot h_{15} \cdot h_{13} \cdot h_{14}} \qquad (11)$$

$$\overline{W_2} = h_{17} = \overline{h_{13} \cdot h_{14} \cdot h_{15} \cdot h_5} \qquad (12)$$

In these expressions $h_{15}$ represents the inversion of $h_6$. The output signals $$P_2 = h_5 \cdot h_{13} \cdot h_{14} \cdot h_{15} \qquad (13)$$

$$W_2 = h_5 \cdot h_{13} \cdot h_{14} \cdot h_{15} \qquad (14)$$

are produced in the inversion stages H 18 and H 19 which, if the system is functioning correctly, correspond to the stages H 16 ... H 19. These are fed into the evaluation circuit whose purpose it is to combine the $P_\lambda$ and $W_\lambda$ signals of all the relevant λ register stages.

The principle of the evaluation circuit is illustrated in FIG. 10*b*. A check is undertaken to the H 20 and H 21 stages whether all the $P_\lambda$ and $W_\lambda$ signals exhibit the binary value "L." Once this criterion is satisfied the coincidence pulse K is produced in stage H 24 by the combination of the output signals of the stages H 22 and H 23 with the pulse signal $T_\lambda$. The rest of the evaluation circuit is unchanged compared with that in FIG. 7.

The significance of the "simulation input" in FIG. 10*a* has yet to be explained. It is feasible that a code reader designed to scan a six-position code (corresponding to six colored rings) for instance could be used for checking a four-position code. It then becomes necessary to produce the coincidence criteria for the missing fifth and sixth positions by simulation. A "0" setting of the selector switch M can be used for the purpose, as shown in the left-hand bottom corner of FIG. 10*a*. In this case a "0" is produced at the inputs of the gate stages H 13, H 14, H 15 and H 5 which results in an "L" at each of the signal outputs $P_\lambda = P_2$ and $W_\lambda = W_2$.

The simulation setting can further be used for sorting purposes, for instance if an object with a certain characteristic at a certain position (e.g., the color R at the third color ring) is to be picked out of a collection of coded objects. In this case the irrelevant positions are simply marked with an "0".

In service the embodiment of FIG. 6*a* and 6*b* can be simplified since only the actual code word (e.g., with four positions) need be programmed above the code composition without the supplementary data. The circuit is then designed so that the number of positions of the code can easily be extended. An additional printed-circuit module is required per extra code position. Six positions are already capable of distinguishing between 45,656 possibilities. The reliability in the recognition of the code provided by the arrangement in FIGS. 10*a* and 10*b* is extremely high. Fight conditions must be satisfied per code position (one coincidence and five anticoincidences in the case of the "color sign" and one coincidence with one anti-coincidence in the case of the "class sign") before the code position in question is pronounced correct. Thirty-two checking criteria must therefore be satisfied simultaneously with a four-position code and 48 with a six-position code before the "good" K pulse can be produced. Faulty codes or irregularities in the circuit can hardly remain undetected under such circumstances.

I claim:

1. A method of comparing a color-coded identification on an article against a predetermined reference code, the color code comprising the three primary colors red, blue and green and the three complementary colors magenta, cyan and yellow, the method comprising scanning the color-coded identification with white light, filtering the light received from the color-coded identification into separate colors, imaging the filtered light onto means for producing signals each representing a different one of the six colors, determining if the colors scanned are the same as those included in the reference code and in the same relative positions, producing a first signal each time a primary color is scanned, producing a second signal each time a complementary color is scanned, counting the number of color signals and the number of first and second signals, comparing the counts with corresponding counts of the number and type of colors in said reference code and producing a signal indicating that the scanned color-coded identification corresponds with the reference code after comparison of said counts indicates equality of the counts.

2. A method of converting color-coded information into binary coded information, the original information being a data word coded in the primary colors red, blue and green and the complementary colors cyan, magenta and yellow, and having a predetermined number of primary colors and a predetermined number of complementary colors, which comprises the steps of detecting each of the colors included in the original color-coded information and generating signals each representing a different one of the detected colors to form a group of pulses representing in binary code the original color-coded information, producing a first signal each time a primary color is detected and a second signal each time a complementary color is detected, utilizing the first and second signals to check that said group of binary coded pulses includes pulses representing said predetermined number of primary and complementary colors, providing a reference data word, comparing said group of pulses with the reference data word, counting the number of elements in said group of pulses and comparing the count with a count of the number of bits forming said data reference word, counting the number of pulses in said group representing primary colors and comparing the count with a corresponding count of the bits in said reference data word representing said primary colors and counting the number of pulses in said group representing the complementary colors and comparing the count with a corresponding count of the bits in said reference data word representing said complementary colors.

3. A method according to claim 2, including generating an output signal when the data word represented by said group of signals is the same as the reference data word after all the comparison steps have been carried out and equivalence between the various circuits established.

4. Apparatus for converting color-coded information into binary coded information, the original information being a data word coded in primary colors red, blue and green and the complementary colors cyan, magenta and yellow and having a predetermined number of primary colors and a predetermined number of complementary colors, said apparatus comprising means for detecting each of the colors included in the original color-coded information, means responsive to said detecting means to generate signals each representing a different one of the detected colors, a first logic circuit responsive to said signals to produce a group of pulses representing in binary code the original color-coded information, means for producing a first signal each time a primary color is detected, means for producing a second signal each time a complementary color is detected, a checking circuit responsive to said first and second signal producing means to generate a signal indicating that said group of binary coded pulses includes pulses representing said predetermined number of primary and complementary colors, means for providing a reference data word, first means for comparing the group of pulses with the reference data word, a first counter for counting the number of elements in said group of pulses, second means for comparing the count of the first counter with a count of the number of bits forming said data reference word, a second counter for counting the number of pulses in said group representing primary colors, third means for comparing the count of the second counter with a corresponding count of the bits in said reference data word representing said primary colors, a third counter for counting the number of pulses in said group representing the complementary colors and fourth means for comparing the count of the third counter with a corresponding count of the bits in said reference data word representing said complementary colors.

5. Apparatus according to claim 4, in which said first, second, third and fourth comparing means each provide a signal indicating equality of the information applied thereto and said apparatus further includes means for generating an output signal in response to the signals produced by the first, second, third and fourth comparing means.

6. Apparatus for comparing a color-coded identification on an article against a predetermined reference code, the color code comprising the three primary colors red, blue and green and the three complementary colors magenta, cyan and yellow, the apparatus comprising means for scanning the color-coded identification with white light, filter means for filtering the light received from the color-coded identification into separate colors, a decoding circuit including photosensitive means arranged to receive the filtered light and produce signals each representing a different one of the six colors, a first signal each time a primary color is received and a second signal each time a complementary color is received, and a checking circuit including means for determining if the signals representing the six colors produced by said decoding circuit correspond with the colors and relative positions of the reference code, a first counter for counting said first signals, first means for comparing the count of the first counter with a corresponding count of the number of primary colors included in said reference code, a second counter for counting the second signals, second means for comparing the count of the second counter with a corresponding count of the number of complementary colors in said reference code and means for producing an output signal indicating that the color-coded identification corresponds with said reference code when the first and second comparing means indicate that the counts applied thereto are the same.

7. Apparatus according to claim 6, in which said determining means includes a plurality of switches, one for each bit included in said reference code, and each switch having six positions corresponding to the six colors so that the switches can be set to represent said reference code, a plurality of logic circuits coupled to said switches to receive the signals produced by said decoding circuit when the settings of the switches representing the reference code correspond to the scanned color-coded identification as represented by the signals applied to the switches and timing means for producing synchronizing signals for application to said logic circuits upon scanning of said color-coded identification.

* * * * *